MULTIPARTY IDENTIFICATION SYSTEM

Filed Feb. 27, 1953 5 Sheets-Sheet 1

INVENTOR
B. F. LEWIS
BY J. W. Schmied
ATTORNEY

Sept. 10, 1957 B. F. LEWIS 2,806,091

MULTIPARTY IDENTIFICATION SYSTEM

Filed Feb. 27, 1953 5 Sheets-Sheet 2

INVENTOR
B. F. LEWIS
BY J. W. Schmied
ATTORNEY

Sept. 10, 1957 B. F. LEWIS 2,806,091

MULTIPARTY IDENTIFICATION SYSTEM

Filed Feb. 27, 1953 5 Sheets-Sheet 3

INVENTOR
B. F. LEWIS
BY
J. W. Schmied
ATTORNEY

INVENTOR
B. F. LEWIS
BY J. W. Schmied
ATTORNEY

INVENTOR
B. F. LEWIS
BY J W Schmied
ATTORNEY

United States Patent Office 2,806,091

Patented Sept. 10, 1957

2,806,091

MULTIPARTY IDENTIFICATION SYSTEM

Benjamin F. Lewis, Bayside, N. Y., assignor to Bell Telephone Laboratories, Incorporated, New York, N. Y., a corporation of New York Application February 27, 1953, Serial No. 339,409

10 Claims. (Cl. 179—36)

This invention relates to identification systems and more particularly to multifrequency identifiers for party lines.

With the expansion of automatic telephone systems to serve larger areas and to provide means for subscriber dialing of toll calls to adjacent areas through the advent of automatic message accounting or automatic ticketing arrangements, it has become imperative that accurate and reliable means be provided for identifying subscribers who originate toll calls in order that the charges may be properly billed. In telephone systems in which the connection between subscribers' lines are established by means of automatic switching mechanism and in which each subscriber's line is provided with but a single substation, the identification of this substation presents little difficulty. When, however, a subscriber's line has a plurality of substations, the identification of a calling subscriber station is more difficult.

Systems have been proposed heretofore in which the identification of a party line subscriber is accomplished by the application of sources of alternating current of different frequencies. Vibrating reeds have been provided at each substation which are selectively responsive to the frequencies applied.

A major problem in the operation of any audio frequency telephone signaling system is the production of interference in other circuits. The severity of the interference is a function of the level of the signal and also of the noise influence and susceptibility factors which take into account such things as frequency response of the ear; line and subscriber set characteristics; coupling impedance and the probability of unbalances. For a signaling frequency below 1000 cycles these interference factors become more favorable as the frequency decreases. The limiting factor in decreasing the signaling frequencies is the minimum practical operating frequency for the vibrating reed selectors of approximately 277.5 cycles, which still results in interference.

Moreover, in the prior art multifrequency identification systems, an individual frequency is necessary for each of the stations in the party line so that a fairly large plurality of stations, for example nine, would require a complex nine-frequency signal. The arithmetic progression in the number of frequencies for each subscriber greatly increases the complexity of the required associated apparatus.

It is then an object of the present invention to provide for reliable automatic identification of the calling party of a multiparty subscriber line.

Another object of the present invention is to provide a multifrequency identification system which provides negligible interference with other circuits.

Still another object of the present invention is to provide a low frequency identification system in which the detection of a signal from the calling party is accomplished on a metallic versus longitudinal basis, as well as on a frequency basis.

Still another object of the present invention is to provide a party line identification system wherein the number of frequencies utilized is less than the number of stations on the party line.

Still another object of the present invention is to provide a multifrequency identification system wherein the frequencies detected are sum or harmonic frequencies of the original identification frequencies from the central office.

A feature of the present invention relates to the provision of a calling party identification system utilizing vibrating reed selectors and frequency doublers wherein the use of the frequency doublers substantially reduces the interference with adjacent audio systems and due to its modulation characteristics reduces the number of frequencies that are required from the central office.

Still another object of the present invention is to provide an identification system which cannot be made to operate falsely by a subscriber and which will indicate when more than one party has the receiver off the hook.

Still another object of the present invention is to provide an identification system that can be operated at any time after dialing is completed.

Still another object of the present invention is to provide a multifrequency identification system which does not cause excessively loud sounds to be heard by the calling subscriber.

Another feature of the invention relates to means that can be used with the calling party identification system to insure proper operation in the presence of induction from alternating-current power lines.

Still another feature of the invention pertains to the provision of means that can be used with the calling party identification system to reduce the voltage applied to elements of the system in the case of lightning induction.

Still another feature of the present invention relates to the provision of a party line identification and ringing circuit utilizing vibrating reeds wherein the same vibrating reed functions during identification and during ringing.

The present invention overcomes the difficulties presented by the prior art and accomplishes the foregoing objects and features by providing an identification system for multiparty lines utilizing vibrating reed selectors. A multifrequency actuating signal from the central office is sent over the two wires of the subscriber's circuit on a ground return or longitudinal basis. In one embodiment of the invention the frequencies are the same as the response frequencies of the vibrating reed selectors. In two other embodiments the frequencies from the central office are lower than the response frequencies of the vibrating reed selectors and the vibrating reed selectors are actuated through a rectifying bridge circuit wherein the frequencies are doubled and modulated. The modulation of the frequencies provides sum frequencies as well as harmonics so that the number of frequencies from the central office can be less than the number of reeds that are to be selectively energized. For example, in a party line having nine subscribers only five actuating frequencies are necessary.

Further objects, features and advantages will become apparent to those skiled in the art upon consideration of the following description taken in conjunction with the drawings wherein:

Figs. 1 and 2, when arranged according to Fig. 6, illustrate a multifrequency identification system wherein the frequencies sent from the central office are the same as the response frequencies of the vibrating reed selectors and wherein the return identification signals are detected at the central office on a metallic versus longitudinal basis;

Figs. 3 and 5, when arranged according to Fig. 7, illustrate a multifrequency identification system utilizing a reduced number of frequencies each at approximately half the frequency of a vibrating selector reed in the substation and where the return identification signals are detected on a frequency discrimination plus metallic versus longitudinal basis;

Figs. 4 and 5, when arranged in accordance with Fig. 8, illustrate a modification of the identification system of the present invention where it is necessary to supply a metallic direct current to the party line;

The circuits which are described represent the arrangement that exists when identification of the calling party is being made; the arrangement is established by the control circuits of the central office when identification is required.

Figures 1, 6, 7, 8:
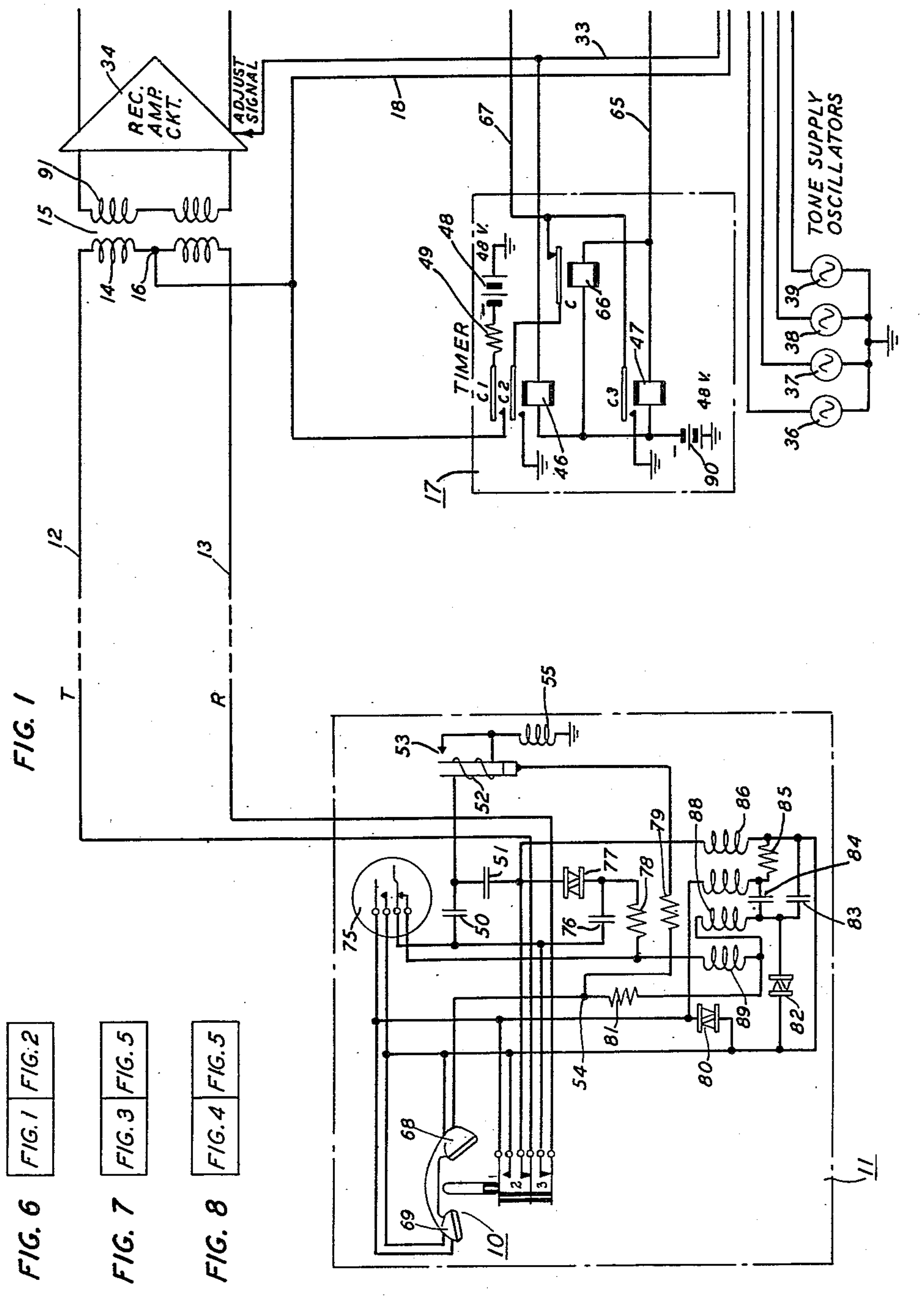
Fig. 6 illustrates the arrangement of Figs. 1 and 2.
Fig. 7 illustrates the arrangement of Figs. 3 and 5.
Fig. 8 illustrates the arrangement of Figs. 4 and 5.
Figure 2:
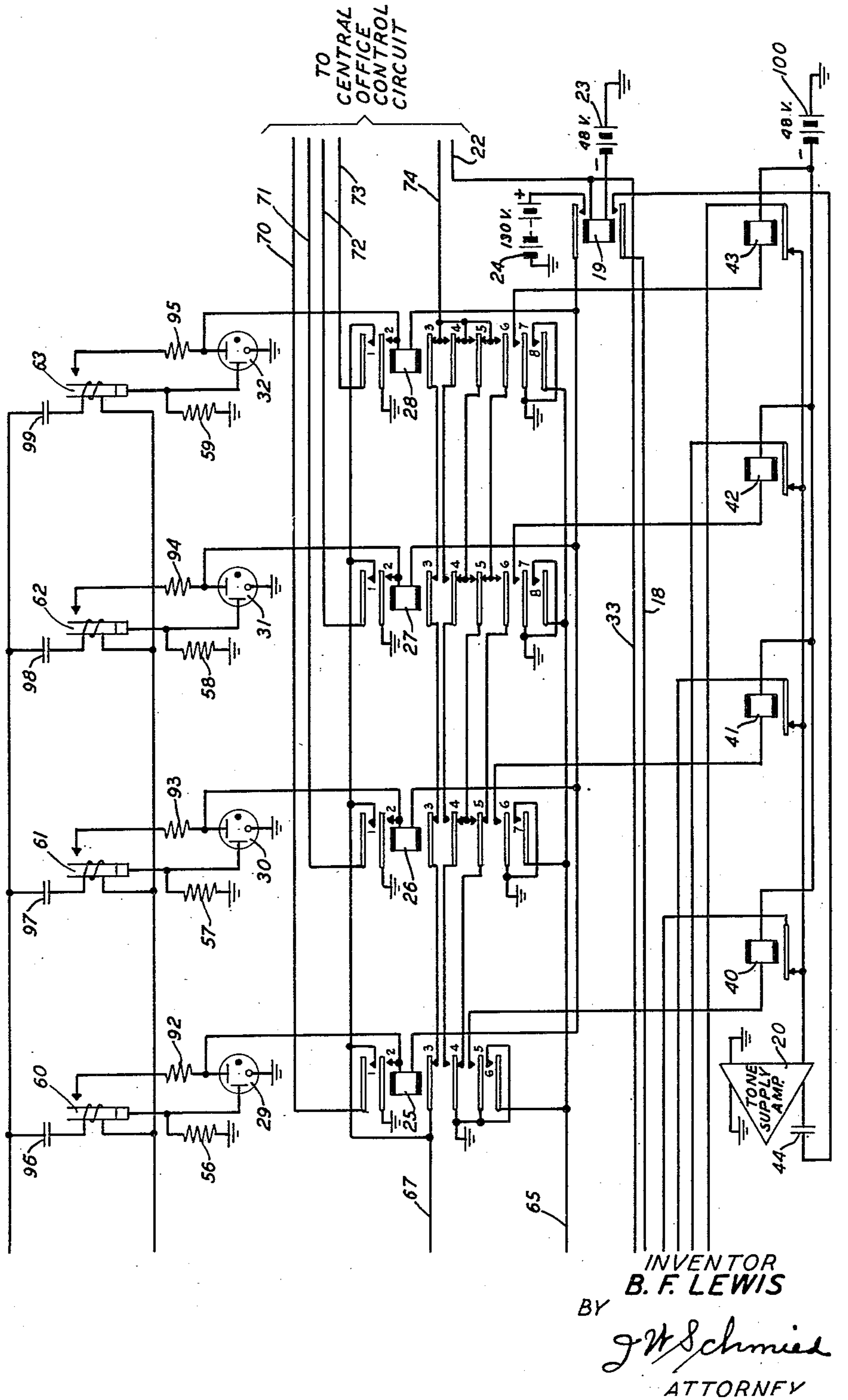

Referring to Figs. 1 and 2, when arranged in accordance with Fig. 6, the handset 10 is part of the apparatus in the substation or subset 11, indicated by the dash line. The substation 11 is one of a plurality of substations, not shown, which are connected through the tip and ring leads 12 and 13 to the central office and is of a type well known in the art as exemplified by the Patent 2,602,402 which issued to Botsford-Boysen-Aikens-Dietze-Goodale-Inglis on December 2, 1952. It is assumed that only substation 11 is in use and has the switchhook contacts 1, 2 and 3 in the positions shown. All the other substations connected to the tip and ring leads 12 and 13 are not in use and have their corresponding switchhook contacts 1 closed and switchhook contacts 2 and 3 open. The tip and ring leads 12 and 13 are connected to the opposite sides of the primary 14 of the transformer or repeat coil 15 which is located in the central office. The center tap 16 of the primary 14 is connected to a timer 17 and to a tone lead 18. The tone lead 18 is connected through the lower operated contact of the start relay 19 to the tone supply amplifier 20.

To initiate the identification operation ground is closed by the central office control circuit, not shown, on the start lead 22 to operate the start relay 19 which is connected thereto and to the −48 volt battery or source of potential 23. The operation of relay 19 closes the +130 volt potential source 24 through its upper contacts and the windings of the four-party identifier relays 25, 26, 27 and 28 to the main anodes of the gaseous triodes 29, 30, 31 and 32. The +130 volts applied to the main anode of the triodes 29 through 32 are insufficient to cause ionization. Each of the relays 25 through 28 and the corresponding of the triodes 29 through 32 is responsive, as is hereinafter described, to the identification of one of the subsets 11, etc. Since there are four such relays and tubes the identification system that is shown in Figs. 1 and 2 provides for a four-party line. Any number of parties may, however, be provided on the line, utilizing the principles of the present invention.

The ground closed to the start lead 22 is also connected through lead 33 to the receiving audio amplifier circuit 34 and to timer 17. The ground connected to the amplifier circuit 34 is to initiate the adjustment of the gain of the amplifier to take into account the various lengths of subscribers' loops and also any unbalance of the subscriber's line 12—13 particularly that due to leakage. This adjustment is made during the first $\frac{1}{10}$ second of transmission of the actuating signal, hereinafter described, from the central office so as to precede the selecting operation at the station 11. Ground connected to the amplifier circuit 34 causes the amplifier gain to be adjusted during this initial period so that any false signal due to unbalance will not operate any of the frequency detector units 60 through 63 also hereinafter described. The increase in signal when the substation 11 makes its selection will then produce proper detection and identification. The adjustment of amplifier gain for non-operation on the preliminary signal is a procedure known in the art and therefore not described herein in detail.

At the central office, four frequencies are transmitted on a ground return or longitudinal basis over the subscriber's loop from the tone supply oscillators 36 through 39. The oscillators 36 through 39 are connected respectively through the normal contact of the break relays 40 through 43 to the tone supply amplifier 20. The tone supply amplifier 20 and the receiving amplifier 34, described above, may be any type audio amplifier having a response that will amplify the four frequencies ranging from 277½ to 322½ cycles. The complex wave consisting of the four amplified frequencies is connected from the tone supply amplifier 20 through the capacitor 44 and the lower operated contact of the start relay 19 to the tone lead 18. During the time that the four frequencies are being connected to the tone lead 18, the timer 17 operates due to the ground connection through lead 33. The operation of timers, such as timer 17, is well known in the art as exemplified by the Patent 2,585,904 to A. J. Busch which issued February 19, 1952, and the Patent 2,583,088 to Clutts-Pullis-Schenck-Weber which issued January 22, 1952. Lead 33 is connected through the winding of relay 46 to the −48 volt battery 90. Relay 46 therefore operates and closes −48 volts from battery 48 through the 10,000-ohm resistor 49 to the center tap 16 of the primary 14 described above. Initiation of the identification of a subscriber on the party line 12—13 is thus established with the connection of the four frequencies and a −48 volt potential to the center tap 16.

The sequence of operations that occurs when ground is connected to relay 46 proceeds in the following manner: Two-tenths of a second after the ground connection, the upper contact, C1, of relay 46 closes and one second after ground is applied the lower contact, C2, closes. If lead 65, hereinafter described, is grounded the contact associated with relay 66 opens immediately and $\frac{3}{10}$ of a second later the contact C3 associated with relay 47 closes.

The ring lead 13 described above is connected through the operated contact 3 of the switching contacts of the substation 11 to the capacitor 50 and the tip lead 12 is connected through the operated contact 2 of the switching contacts to the capacitor 51. The capacitors 50 and 51 are therefore connected across the line 12—13 when the handset is removed from the cradle of the substation 11. The capacitor 50 is connected to the capacitor 51 and to the winding of the vibrating reed selector 52. The vibrating reed selector 52 is responsive to one of the four frequencies from the tone supply oscillators 36 through 39. Each party on the multiparty line 12—13 has a selector which is responsive to one of the four frequencies. The frequencies that are utilized are in a range between 277½ and 322½ cyles and are the lowest practical frequencies that can be utilized. The lower limit of the operating frequencies is controlled by the limitations in the design of the vibrating reed selectors.

When a call is originated from the subscriber station 11 the winding of the vibrating reed selector 52 is connected to ground from the mid-point of the two .05 microfarad capacitors 50 and 51 that are bridged across the line as described above. Selector 52 is in this manner operated by one of the transmitted frequencies and vibrates causing its contact 53 to close periodically at the operating frequency. Since there is a direct-current potential to ground on the loop from the battery 48, the opening and closing of the contact 53 produces a new signal which has, as its fundamental frequency, the nominal frequency of the calling subscriber station 11.

The delay is provided in closing the contacts of relay 46 in timer 17, as described above, so that the contact 53 of the vibrating reed selector 52 will be closing before the line capacitance charges to battery potential. This procedure reduces the noise heard by the calling subscriber and limits the magnitude of the capacitance discharge current through the contact 53 of selector 52. The contact 53 of vibrating reed selector 52 is grounded through the carrier frequency retard coil 55. The purposes of the retard coil 55 are: (1) to limit the interference to carrier telephone systems that might be exposed to the subscriber line 12—13; and (2) to reduce the voltage applied to the vibrating reed selector contact 53 in the case of lightning induction. If there are no carrier systems exposed to the subscriber's line and if the possibility of lightning induction is negligible coil 55 may be omitted and contact 53 connected directly to ground. The closed contact 53 is connected through the 1000-ohm, contact protection, resistor 79 to the junction point 54 between the resistor 81 and the transmitter 68 of the handset 10. The point 54 has some unbalance and therefore a portion of the new signal will flow in the loop and will be transmitted metallically to the central office. The resistance 81 is connected to the induction segment 89 which is connected through the dialing contacts 75 and switchhook contact 3 to the ring lead 13. The transmitter 68 of the handset 10 is connected to the tip lead 12 through the segment 86 and the operated switchhook contact 2. The subset 11 contains three equalization elements 77, 80 and 82 of the type described in the above-identified patent to Botsford et al. By changing the connection from contact 53 to other points along resistance 81 the metallic component of the produced signal can be increased or decreased as desired. The element 77 compensates for unequal length loops and connects the switchhook contact 2 with the segment 89 through the resistor 78; the element 80 is a click reduction element and is connected across the receiver 69 of the telephone set 10; and the element 82 connects the segments 88 and 86 and is across the capacitor 83. Since the vibrating reed selector 52 is connected to the set side of the switchhook contacts 2 and 3, the selector of a given station is only connected to the loop 12—13 when the station is in use.

At the central office the metallic component from the selector 52 is transmitted through the repeating coil 15 and the amplifier 34 to four frequency detector units comprising selectors 60, 61, 62 and 63 through the capacitors 96, 97, 98 and 99, respectively. The detector units also include the gaseous triodes 29 through 32, and the relays 25 through 28 described above. Each detector unit corresponds to one of four frequencies from the selectors on the line 12—13. The detector unit corresponding to the calling party will be operated and provides the identification, as is hereinafter described. As described above, the amplifier gain of the receiving amplifier 34 is adjusted so that any signal which is received before the operation of the selector 52 will not operate any of the frequency detector units. Normally the vibrating reed selector 52 operates at the end of a few tenths of a second with sufficient amplitude to close its contact 53. The level of the frequency corresponding to selector 52 increases in the metallic circuit to operate the corresponding of selectors 60 through 63. The operation of the selector 60 through 63 causes the application of a positive potential through the respective resistor 92 through 95 to the starting anode of the respective gas tube 29 through 32. The grounded one-megohm resistors 56 through 59 which are connected to the starting anodes hold the starting anodes at ground potential except when any of the selectors 60 through 63 operate. For example, if the selector 61 is of the same frequency as selector 52 in station 11, its operation causes the starter gap of tube 30 to ionize. Due to the +130 volts from battery 24 the ionization is transferred to the main anode of tube 30 so that the opening of the contacts of selector 61 will not interfere with the continued ionization of tube 30. The operation of the tube 30 causes the associated relay 26 to operate since the current through the tube 30 passes through the winding of relay 26 as well. When the relay 26 operates, it locks to ground through its contact 2 and simultaneously extinguishes its corresponding gas tube 30. When one of the relays 25 through 28 operates, it also causes the operation of the corresponding relay 40 through 43 described above. The operation of relay 26 closes ground through its contact 6 to operate relay 41. When the corresponding relay 40 through 43 operates, it removes the particular frequency corresponding to the calling station from the subscriber line as, for example, the operation of relay 41 breaks the circuit through its contact from oscillator 37. This procedure reduces the signal heard by the calling subscriber.

At the same time that relay 41 is operated, the operation of the relay 26 grounds the lead 65 through its contact 7 to operate relays 66 and 47. Three-tenths of a second after relay 66 operates, the operation of relay 47 closes ground to lead 67. The 3/10 of a second interval is provided to insure operation of vibrating lead selectors of other stations that may be connected to the subscriber line at the time of identification and insures that if such intrusion exists a double identification will be indicated. For normal identification without intrusion, ground on lead 67 places a ground on one of the leads 70, 71, 72 or 73 through the operated contact 1 of the operated relays 25 through 28 providing an indication of which party is making the call. If more than one of the detectors are operated, ground is placed on the lead 74. For example, if selectors 61 and 63 are energized operating their associated relays 26 and 28, a path from ground is provided through contact 4 of relay 25 normal, contact 5 of relay 26 operated, contact 5 of relay 27 normal and contact 6 of relay 28 operated, to lead 74. This ground connection is placed upon lead 74 during or before the 3/10 of a second delay by relay 47 so that this intelligence is received in the central office control circuits before any of the leads 70 through 73 can be grounded. If no detector operates, relay 66 of the timer 17 will not operate and at the end of one second closing of the contacts associated with relay 46 connects ground through the lower contact of relay 46 and the normal contact of relay 66 to lead 67 and through the normal contacts 3 of relays 25 through 28 to lead 74.

When the central office control circuit, not shown, receives a ground either on the leads 70 through 73 or on the lead 74, it will release the identification circuit and establish a talking connection. If only one of the leads 70 through 73 is grounded and lead 74 is not grounded the identification is normal. The identification of the calling party will be registered by the control circuit and a talking connection will be established to the called subscriber. If the lead 74 is grounded no identification or a double identification is signified, as described above, and the control circuit will connect the subscriber line 12—13 to an operator who will challenge the identification of the call. When the control circuit disconnects the identification circuit and ground is removed from the lead 22, all relays of the identification circuit will restore to normal.

Figure 3:
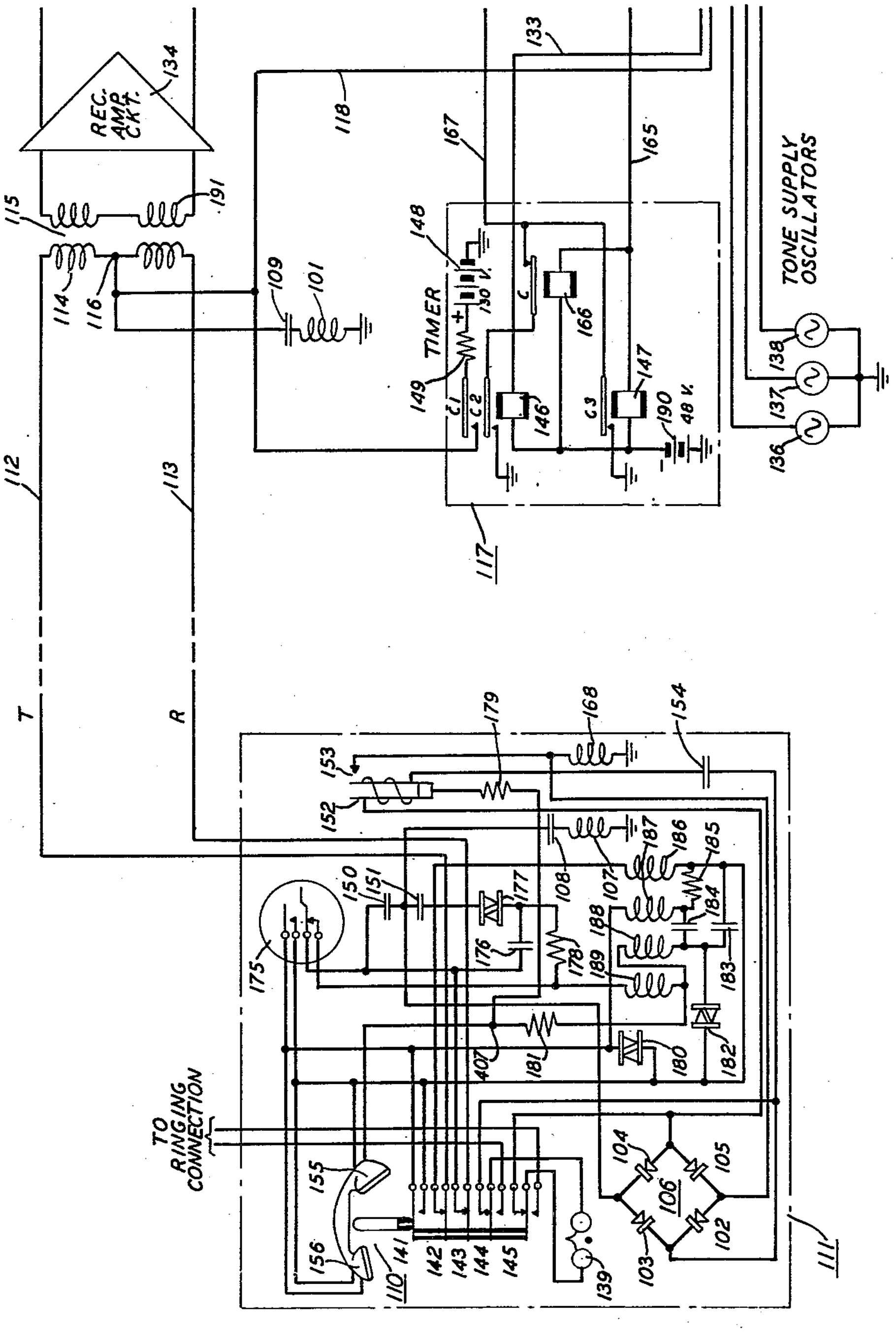
Figure 5:
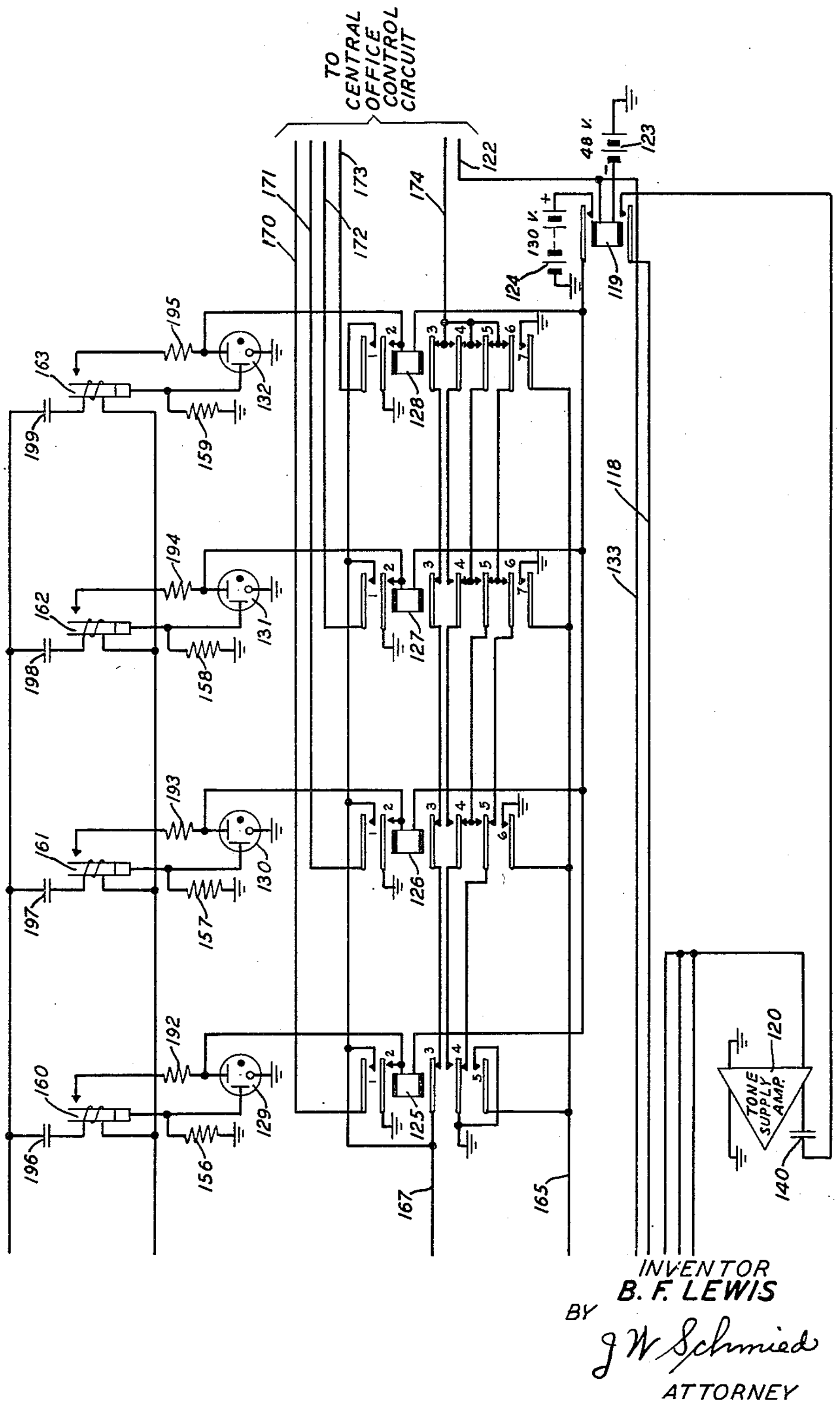

Referring now to Figs. 3 and 5, arranged in accordance with Fig. 7, an identification system is shown that is satisfactory from the interference standpoint for use with full measured service, that is, where identification is made on every originated message call. Components that are similar to those in Figs. 1 and 2 are designated by the same number plus 100. The selector, for example, is designated 152. This system, as is hereinafter described, uses vibrating reed selectors 152, etc. at the subscriber stations 111, etc. in a similar manner as described above in reference to Figs. 1 and 2, and in addition provides a rectifier network 106 as a modulator and a frequency doubler. With this arrangement, as is hereinafter described, the frequencies of the signals that are transmitted from the central office can be lowered to approximately one-half of those required in the modification described above in reference to Figs. 1 and 2. Due to the inherent loss in the rectifier network 106, the level of the transmitted signal must be approximately 8 decibels higher, but the reduction in the interference factor due to the use of the lower frequencies gives a sufficient net improvement in interference to be desirable for identification with full measured service.

Due to the modulation action of the rectifier bridge 106, signals that can operate a selector such as selector 152 are produced by the sums of the transmitted half frequencies as well as their doubled values, providing that the half frequencies are evenly spaced. As a result of this effect, the alternate intermediate frequencies are not required. With a four-party line either of the two intermediate frequencies can be omitted. For example if tone supply oscillators 136, 137 and 138 supply respectively 138.75, 146.25 and 161.25 cycles, the four selectors 152, etc. in the stations 111, etc. would be responsive to frequencies of 277.5, 292.5, 307.5 and 322.5 cycles, respectively. The 307.5-cycle frequency would be provided by the modulating effect of the corresponding rectifier bridge providing a sum frequency of the 146.25 and 161.25-cycle sources 137 and 138.

The general requirements for the number of frequencies that are needed depend therefor upon the total of the discrete selectors to be operated. In the following series of paired numbers, the first number indicates the number of parties on a line and the second the required number of transmitted frequencies from the central office for selectors with uniform frequency increments: 1—1, 2—2, 3—2, 4—3, 5—3, 6—4, 7—4, 8—5, 9—5, etc.

Another advantage achieved by the utilization of the rectifier network 106 is that the discrimination of the signal generated by the operation of the vibrating reed contact 152 from the signals sent out by the central office can be accomplished on a frequency basis in addition to the longitudinal versus metallic advantage. The improvement provided by the frequency discrimination eliminates the need for any automatic amplifier adjustment. The receiving amplifier 134 includes a filter that suppresses the transmitted frequencies and the detection units 160 through 163 are operated only by the signal received from the calling station. The amplitude of this signal must be only sufficient to override general noise and it can be limited to a value that is low enough to produce no objectionable interference, either to the calling subscriber or in other circuits. This level is controlled mainly by the .1 megohm battery supply resistance 149 at the central office.

To initiate the identification operation the central office control circuit, not shown, applies a ground potential to the start lead 122. The means responsive to the initiation of a call for energizing the central office control circuit are not shown being old in the art. For example, the lifting of the handset 110 could energize a calling lamp, also not shown, and attract the attention of an operator who would set up the identification connection and ground the lead 122. The grounding of lead 122 provides an operating path for start relay 119, and for relay 146 in timer 117. The operation of relay 119 applies a +130 volt potential from battery 124 to the main anodes of gas triodes 129, 130, 131 and 132 through the windings of relays 125, 126, 127 and 128, respectively. The +130 volts are insufficient to cause the breakdown of the triodes 129 through 132 to provide operating paths for the relays 125 through 128. The ground applied through start leads 122 and 133 to the timer 117 causes it to function and relay 146 operates. Two-tenths of a second after the application of ground potential upon lead 133, the upper contact of relay 146 closes, and one second thereafter the lower contact closes. If lead 165 is grounded, as is hereinafter described, relays 166 and 147 operate. Three-tenths of a second after application of ground potential to lead 165 the contact of relay 147 closes. The contact of relay 166 opens substantially immediately. The contacts in timer 117 remain closed or operated until ground is removed from the leads 133 and 165. A timer of the type described above is old in the art as exemplified by the above-identified patents to A. J. Busch and to Clutts et al.

The operation of relay 119 described above also closes a path from the tone lead 118 through capacitor 140 to the tone supply amplifier 120. Three audio oscillators 136, 137 and 138 are connected to the amplifier 120 and thus three frequencies are connected to the tone lead 118. The tone lead 118 is also connected to the center tap 116 of primary 114 of repeat coil 115. In this manner the three frequencies or tones, 138.75 cycles, 146.25 cycles, and 161.25 cycles, described above, are connected to the line 112—113. The three frequencies are therefore applied to the four stations 111, etc.

The line 112—113 is bridged by the capacitors 150 and 151 which are connected thereacross through the switchhook contacts 142 and 143. The junction of the bridging capacitors 150 and 151 is connected to a copper oxide or selenium oxide varistor bridge circuit 106 at the junction of the two varistors 103 and 104. The opposite junction between the varistors 102 and 105 and the contact 153 of vibrating reed selector 152 are grounded through the carrier frequency retard coil 168. The winding of selector 152 in series with the capacitor 154 is connected to the other two junctions of the bridge 106. The bridge circuit 106 is essentially a frequency doubler so that the 138.75, 146.25 and 161.25-cycle input across the 103—104 and 102—105 junctions provides an output of 277.5, 292.5 and 322.5 cycles to the selector 152. In addition to its frequency doubling characteristic the bridge circuit 106 modulates the three input frequencies providing their sum frequencies to the selector 152. The sum of 146.25 and 161.25 is 307.5 so that this frequency is applied as well to the selector 152. To insure a steady additive combination of the sum and doubled frequency products the oscillators 136, 137 and 138 must have their oscillations derived from the same fundamental source. There are three sum frequencies resulting from the modulation effects of the varistor bridge circuit 106; 285.0, 299.0 and 307.5 cycles. It is possible therefore to identify six parties on a line utilizing a supply of only three frequencies. The limiting factor is the interval between two frequencies that are utilized. With the characteristics of present vibrating reed selectors it is desirable to provide an interval of approximately 15 cycles to insure the identification or selection of only one selector 152, etc. By distributing the frequencies from sources 136, 137 and 138 over a greater range six parties can be identified while still utilizing a differential of at least 15 cycles between responses of the selectors. For example, if the three frequencies supplied were 138.75, 153.75 and 183.75 cycles the six available frequencies from a varistor bridge would be 277.5, 292.5, 307.5, 322.5, 337.5 and 367.5 cycles. At least 15 cycles separate each pair of the available frequencies. On this basis only four frequencies are required for a ten-party line, five for a fifteen-party line, etc.

The amplitude of the sum frequencies is greater than the amplitude of the doubled frequencies. This feature may be utilized to compensate for some of the losses through the bridge circuit by utilizing only sum frequencies for energizing the selectors 152, etc. The required signal voltage to ground at the subscriber station for each frequency when using the sum product for operation of the vibrating reed selector is approximately 4 to 5 volts whereas 7 to 8 volts are required if the selector is operated only by the doubled or second harmonic product. For example, to operate with vibrating reed selectors having nominal frequencies of 277.5, 292.5, 307.5 and 322.5 cycles, the transmitted frequencies could be made 131.25, 146.25, 161.25 and 176.25 cycles to provide a frequency sum for the operation of every selector. Certain of the selectors would be operated by the combination of sum frequency products and others by doubled frequency products.

The rectifier network 106 described above produces an alternating-current component which is used to operate the reed selector 152 and a direct-current component. The direct-current component should be absorbed by a direct-current load consisting of a high impedance induction coil, and the ringer 139 of the subscriber set 111 is satisfactory for this purpose. The ringer 139 is connected for this function by the switchhook contacts 4 and 5 when the handset 110 is off the cradle. The .07 millifarad capacitor 154, in combination with the inductance of the winding of selector 152, provides optimum reception of the operating frequency. The doubled frequency components and summed components of the rectified waves are supplied in this manner to the winding of the vibrating reed selector 152 and the series .07 millifarad capacitor 154. The capacitor 154 blocks the flow of direct current and also improves the transmission of the alternating-current energy to the selector winding. The contact 153 of the selector 152 is in series with a 5000-ohm contact protection resistor 179, and is connected to the junction point 407 between the resistor 181 and the transmitter 155 of the handset 110. The junction point 407 has some unbalance and therefore a portion of the new signal will flow in the loop and will be transmitted metallically to the central office.

After the selector 152 is energized, the timer 117 finally allows the upper contact of relay 146 to close. As described above, this contact closes 2/10 of a second after the application of the three tones to the station 111. This delay is introduced to limit the potential to which the line capacitance is charged before the reed selector contact 153 operates. When the contact closes, the +130 volt battery 148 is connected through the .1 megohm resistor 149 to the mid-point 116 of the primary 114 of repeat coil 115. From there it is connected over two parallel paths to resistance 179: (1) by the upper winding of the primary 114, the tip lead 112, the operated switchhook contact 142, the inductor segment 186 and the transmitter 155 of handset 110; and (2) by the lower winding of primary 114, the ring lead 113, the operated switchhook contact 143, the dialing contacts 175, the inductor segment 189 and the resistor 181. The remainder of this direct-current circuit is provided by the resistor 179, the contact 153 of the vibrating reed selector, the carrier frequency retard coil 168 and ground. The operation of selector 152 therefore provides a unidirectional signal which is interrupted at the respective operating frequency of the selector 152 by contact 153. No direct current flows through the transmitter 155 during identification and, therefore, no interference can be caused by subscriber's speech or room noise.

The signal generated by the selector 152 is coupled across the repeat coil 115 to the receiving amplifier 134 which is designed to pass only the doubles and sums of the transmitted frequencies. This filtering is done in the early stages of the amplifier so that overloading cannot produce second harmonics or frequency sums to falsely operate the frequency detectors.

The amplified signal from the receiving amplifier 134 is coupled through the capacitors 196, 197, 198 and 199 to the windings of selectors 160 through 163. Only one of the selectors 160 through 163 will be responsive to the signal. The operation of one of the selectors 160 through 163 causes its associated gas tube 129 through 132 to ionize since the positive potential upon the anode of the tube 129 through 132 is coupled through the respective resistance 192 through 195 and the contact of the operating selector to the starting anode. For example, when selector 161 operates, ionization is initiated through the tube 130. The ionization between the starting anode and cathode of tube 130 is switched or transferred to the starting anode which is at a +130 volt potential from battery 124. When the ionization is transferred across the main gap of the tube 130, a conductive path is provided for the relay 126. When the relay 126 operates, it locks to ground through its contact 2 and extinguishes through this contact connection the gas tube 130. The operation of relay 126 also grounds the lead 165 through its contact 6 to operate the relays 147 and 166 in the timer 117. The contact associated with relay 166 opens immediately and 8/10 of a second later the contact associated with relay 147 closes. The lower contact of relay 146 is still not closed at this time since the sequence of operations as described above to open the contact associated with relay 166 and to close the contact associated with relay 147 is accomplished in less than one second. When the contact of relay 147 closes, a ground connection is placed upon the lead 167 to provide an indication upon one of the leads 170 through 172. In the example described above, when relay 126 operates, the ground connection from lead 167 is connected through contact 1 of relay 126 to the lead 171 providing the required indication. The 8/10 of a second interval that is provided in delaying the closure of the contact associated with relay 147 is provided to insure the operation of vibrating reed selectors in stations other than station 111 that may be connected to the subscriber line at the time of identification. If such an intrusion exists a double identification will be indicated. If more than one detector 160 through 163 operates, a ground connection will be placed upon the lead 174 as well as upon a plurality of leads 170 through 172. For example, if the selector 162 is operated as well as the selector 161, both the relays 126 and 127 operate. A ground connection is connected from contact 4 of relay 125 normal through contact 5 of relay 126 operated, contact 5 of relay 127 operated and contact 5 of relay 128 normal to lead 174. The ground upon lead 167 is delayed by the 8/10 of a second delay in closing the contact of relay 147 to insure the indication of an intrusion.

If no detector operates, relay 166 of the timer 117 will not operate and, at the end of one second after the ground is applied to lead 122, closing of the contacts associated with relay 146 connects ground through the lower contact of relay 146 and the normal contact of relay 166 to lead 167 and through the normal contacts 3 of relays 125 through 128 to lead 174.

When the central office control circuit, not shown, receives a ground on any of the leads 170 through 174 it releases the identification circuit thereby removing the ground from lead 122 and establishes a talking connection. If only one of the leads 170 through 173 is grounded and lead 174 is not grounded the identification is normal and a connection will be established to the called subscriber. If the lead 174 is grounded no identification or a double identification is signified, as described above, and the control circuit will connect the subscriber line 112—113 to an operator who will challenge the identification of the call. When the control circuit disconnects the identification circuit and ground is removed from the lead 122 all relays of the identification circuit will restore to normal.

The circuit comprising capacitor 108 and inductance coil 107, which connects the mid-point of capacitors 150 and 151 of the substation 111 to ground, is provided when there is an excessive amount of alternating-current power induction on the telephone circuit 112—113 due to electromagnetic coupling between an alternating-current power circuit and the telephone circuit. The capacitor 108 and the inductance 107 are in series resonance at the alternating-current power frequency and reduce the amount of power frequency voltage that is applied to rectifier bridge 106. If the power induction due to electromagnetic coupling is low the 108—107 circuit is omitted.

The circuit comprising capacitor 109 and inductance 101, which connects point 116 to ground, is provided when there is an excessive amount of alternating-current power induction on the telephone circuit 112—113 due to electrostatic coupling between an alternating-current power circuit and the telephone circuit. The capacitor 109 and the inductance 101 are in series resonance at the alternating-current power frequency and thus reduce the amount of power frequency voltage between the telephone circuit and ground.

Figure 4:
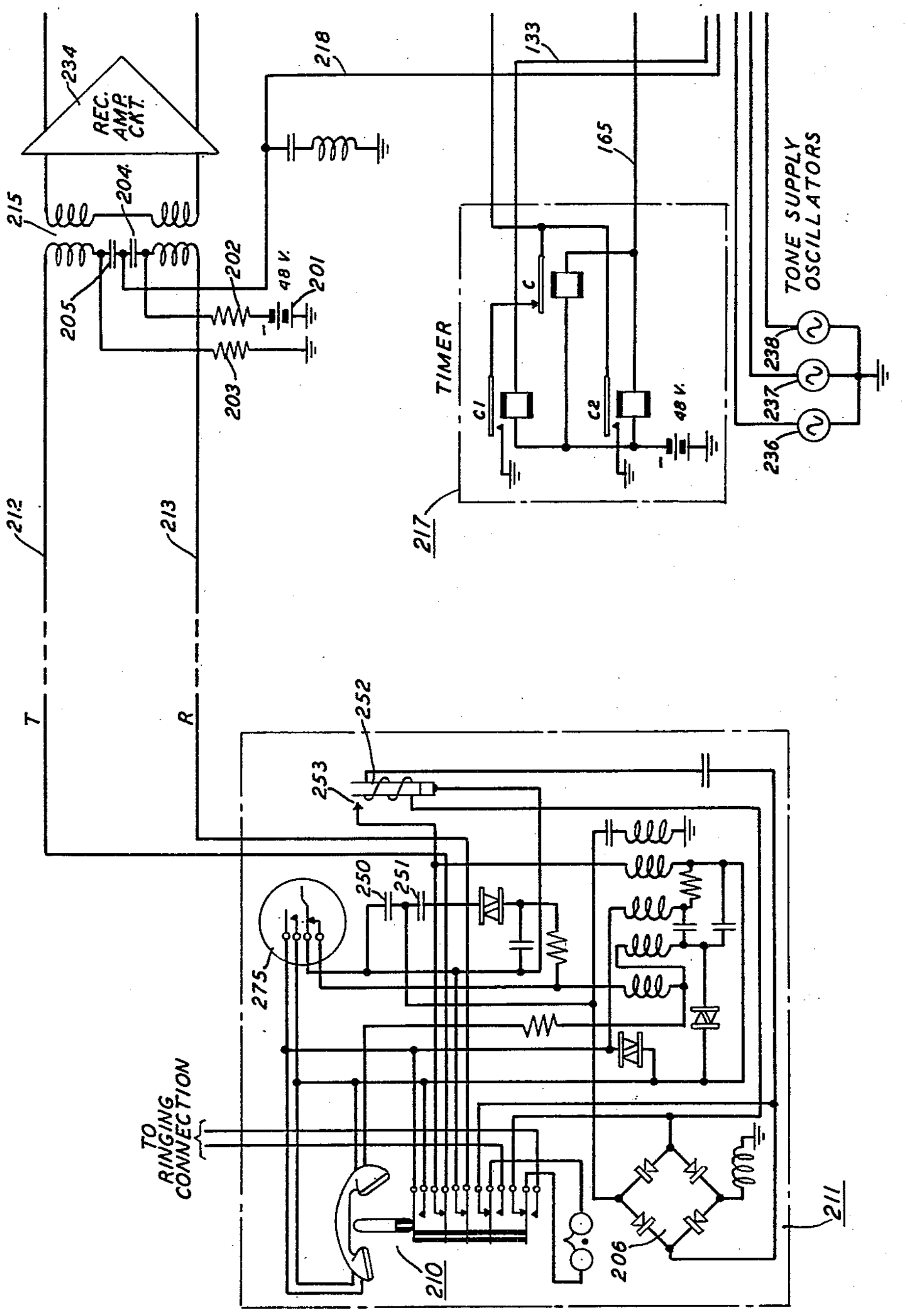

In the modification as described above in reference to Figs. 3 and 5, the contact 153 of the vibrating reed selector 152 is connected between the subscriber line and ground. If severe induction potentials are possible such connection might be objectionable. In the modification shown in Figs. 4 and 5, when arranged in accordance with Fig. 8, the selector contact 253 is connected across the line 212, 213. Components in Fig. 4 similar to those in Fig. 3 are designated by the same number plus 100. To produce a signal when the selector 252 operates in this manner it is necessary to apply a metallic direct current over the tip 212 and ring 213.

The line termination at the central office feeds −48 volt battery 201 and ground through two 5000-ohm resistors 202 and 203 and capacitors 204 and 205 over the loop metallically. No contact is required in the timer 217 for the connection of battery supply 201 as the voltage across the selector contacts 253 is limited by the direct-current resistance of the substation 211. The battery supply 201 is connected as soon as the tip and ring conductors 212 and 213 of the loop are connected to the identification circuit. The operation of the circuit proceeds in a similar manner as described above in reference to Figs. 3 and 5 with the bridge 206 functioning to provide the sum and doubled frequencies. Three sources 236, 237 and 238 are provided by any number may be utilized depending upon the number of parties to be identified. The selected signal is coupled across the capacitors 250 and 251 and the tip and ring 212 and 213, repeat coil 215 and amplifier 234 to the detection and identification circuits shown in Fig. 5.

Multiparty lines require some means of ringing or signaling the particular parties and the vibrating reed selector may be utilized for accomplishing this object. The use of a vibrating selector responsive to a particular frequency, which is sent out from the central office when that party is called, is described in the Patent 2,532,125 of F. J. Singer and L. J. Stacy, which issued on November 28, 1950.

If systems using vibrating reed selectors are employed for selective ringing and for calling party identification on the same multiparty line, the vibrating reed selectors can be used for both functions as they are performed at different times. This joint use of vibrating reed selectors for calling party identification and for selective ringing is also old in the art as exemplified by the Patent 2,717,279, which issued on September 6, 1955, to R. C. Matlack and F. W. Metzger. This joint utility of the selectors can also be employed in connection with the calling party identification scheme presented here. The transfer of the vibrating reed selector from the calling party identification connection to the selective ringing connection is provided by suitable switchhook contacts.

It is to be understood that the above-described arrangements are illustrative of the application of the principles of this invention. Numerous other arrangements may be devised by those skilled in the art without departing from the spirit and scope of the invention.

What is claimed is:

1. A multiparty identification system comprising a central office; and a party line having a plurality of stations connected to said office, said central office having means effective after the initiation of a call from any one of said stations for providing a plurality of frequencies to said party line, some of said stations having selectors responsive to the second harmonics of said plurality of frequencies when a call is initiated thereat and others of said stations having selectors responsive to the sum of two of said plurality of frequencies when a call is initiated thereat, and doubling and modulating circuits for providing second harmonic and sum frequencies of said plurality of frequencies from said central office to said selectors whereby said selector of said calling station is operated.

2. An identification system comprising a multiparty line having a plurality of subscriber stations; and a central office having a plurality of frequency detection circuits, a plurality of frequency supply circuits, and means for connecting said supply circuits to said line on a ground return basis responsive to the initiation of a call from one of said subscriber stations, said plurality of frequency supply circuits being smaller than said plurality of frequency detection circuits and smaller than said plurality of subscriber stations, said calling subscriber stations having selective means for supplying over a closed loop an alternating-current signal having a frequency different from any of the frequencies from said supply circuits responsive to the connection of said sources thereto to energize one of said detection circuits in said central office.

3. An identification system in accordance with claim 2 wherein said selective means comprises means selectively responsive to sum and harmonic frequencies of the frequencies from said supply circuits.

4. In combination a relatively small plurality of oscillators in a central office; a relatively large plurality of frequency responsive subscribers' stations on a party line; and means whereby the harmonics of the oscillating frequencies of said oscillators are utilized to identify some of said subscribers' stations on said party line; and means whereby the sum frequencies of said oscillators are utilized to identify others of said calling subscribers' stations on said party line.

5. A multifrequency identification system comprising a central office and party lines; said central office having alternating-current producing means and detection means, each of said party lines having frequency responsive and producing means associated with each party, and means for energizing said detecting means on a ground return versus metallic basis and on a frequency discrimination basis.

6. A multifrequency identification system in accordance with claim 5 wherein a frequency doubler circuit is associated with each of said frequency responsive and producing means to provide second harmonics and sum frequencies of said central office producing means to said frequency responsive and producing means.

7. A multifrequency identification system in accordance with claim 5 wherein the frequency discrimination is accomplished by having said frequency responsive and producing means selectively tuned to a harmonic of said central office producing means.

8. A multifrequency identification system in accordance with claim 5 wherein said frequency responsive and producing means comprises responsive means tuned to harmonics or sum frequencies of said producing means in said central office.

9. A multifrequency identification system in accordance with claim 8 wherein the number of said producing means in said central office is less than the number of parties on one of said lines.

10. A multifrequency identification system in accordance with claim 9 wherein a frequency doubler and modulator circuit is associated with each of said frequency responsive and producing means to provide second harmonics and sum frequencies of said central office producing means to said frequency responsive and producing means of said party lines.

References Cited in the file of this patent

UNITED STATES PATENTS

| | | |
|---|---|---|
| 1,852,647 | Gooderham | Apr. 5, 1932 |
| 2,202,474 | Vroom | May 28, 1940 |
| 2,281,508 | Lundstrom | Apr. 28, 1942 |
| 2,524,773 | Deakin | Oct. 10, 1950 |